United States Patent
Oh et al.

(10) Patent No.: US 10,410,800 B2
(45) Date of Patent: Sep. 10, 2019

(54) HIGH CAPACITY ENERGY STORAGE CAPACITOR

(71) Applicant: SAMHWA CAPACITOR CO., LTD., Yongin-si (KR)

(72) Inventors: Young Joo Oh, Seoul (KR); Jung Rag Yoon, Yongin-si (KR); Byung Gwan Lee, Osan-si (KR); Jong Kyu Lee, Gunpo-si (KR)

(73) Assignee: SAMHWA CAPACITOR CO., LTD., Gyeonggi-Do (KR)

( * ) Notice: Subject to any disclaimer, the term of this patent is extended or adjusted under 35 U.S.C. 154(b) by 85 days.

(21) Appl. No.: 15/890,721

(22) Filed: Feb. 7, 2018

(65) Prior Publication Data

US 2018/0269007 A1    Sep. 20, 2018

(30) Foreign Application Priority Data

Mar. 20, 2017    (KR) .......................... 10-2017-003481

(51) Int. Cl.
| | |
|---|---|
| *H01G 11/50* | (2013.01) |
| *H01G 11/24* | (2013.01) |
| *H01G 11/46* | (2013.01) |
| *H01G 11/36* | (2013.01) |
| *H01G 11/28* | (2013.01) |
| *H01G 11/34* | (2013.01) |
| *H01G 11/86* | (2013.01) |

(52) U.S. Cl.
CPC ............. *H01G 11/50* (2013.01); *H01G 11/24* (2013.01); *H01G 11/28* (2013.01); *H01G 11/34* (2013.01); *H01G 11/36* (2013.01); *H01G 11/46* (2013.01); *H01G 11/86* (2013.01); *Y02E 60/13* (2013.01)

(58) Field of Classification Search
CPC ........ H01G 11/50; H01G 11/24; H01G 11/26; H01G 11/46
See application file for complete search history.

(56) References Cited

U.S. PATENT DOCUMENTS

| | | | |
|---|---|---|---|
| 2014/0139973 A1* | 5/2014 | Oh | H01G 11/36 361/502 |
| 2014/0266075 A1 | 9/2014 | Gellett et al. | |
| 2016/0111227 A1* | 4/2016 | Asay | C09D 5/24 361/502 |

FOREIGN PATENT DOCUMENTS

KR    20110063472    6/2011

* cited by examiner

*Primary Examiner* — Eric W Thomas
(74) *Attorney, Agent, or Firm* — Cantor Colburn LLP

(57) ABSTRACT

Provided is a high capacity energy storage capacitor including: a cathode; and an anode arranged to face the cathode, wherein the cathode includes a current collector and a cathode material layer formed by applying a cathode material on one side or the other side of the current collector, and the anode includes a current collector an anode material layer formed by applying an anode material on one side or the other side of the current collector, wherein the cathode material is formed by mixing 70 to 99 wt % of nano-perforated graphene coating cathode active material and 1 to 30 wt % of nano-perforated graphene granular body, and the anode material is formed by mixing 70 to 95 wt % of nano-perforated graphene coating anode active material and 5 to 30 wt % of nano-perforated graphene granular body.

8 Claims, 3 Drawing Sheets

HIGH CAPACITY ENERGY STORAGE CAPACITOR

BACKGROUND OF THE INVENTION

1. Technical Field

The present invention relates to a high capacity energy storage capacitor, and particularly, to a high capacity energy storage capacitor, which can improve charge and discharge characteristics by preventing increase of resistance when lithium (Li) ions are intercalated and deintercalated, by improving electrical conductivity by mixing and using an active material coated with nano-perforated graphene on the surface of a cathode or anode active material and nano-perforated graphene granular body.

2. Description of the Related Art

An electric double layer capacitor uses active carbon as electrodes. A technique related to the active carbon used as electrodes of the electric double layer capacitor is disclosed in Korean Laid-opened Patent No. 10-2011-0063472 (Patent document 1).

Korean Laid-opened Patent No. 10-2011-0063472 relates to a method of preparing active carbon used for electrodes of an electric double layer capacitor, and this is a method of preparing active carbon for an electric double layer capacitor, in which active carbon having a small average particle diameter, a uniform particle size and a relative large specific surface area can be produced in an easy and cost-effective way. A carbon material that can be easily graphitized like petroleum coke or coal coke is used as a starting material, and to produce the carbon material, the active carbon is manufactured by plasticizing the starting material under the oxide gas atmosphere, adjusting the particle size of the carbon material and activating the carbon material.

The conventional active carbon of an electric double layer capacitor disclosed in Korean Laid-opened Patent No. 10-2011-0063472 has a problem of low energy density although power density is high since charges are stored by physical adsorption and desorption of ions. A hybrid capacitor improves this problem, and the hybrid capacitor uses different materials for the anode electrode and the cathode electrode. That is, the hybrid capacitor uses active carbon, carbon nano tube, porous carbon or the like as a material of the anode electrode and uses LTO ($Li_4Ti_5O_{12}$) as a material of the cathode electrode and thus improves the problem of the electric double layer capacitor and the problem of low energy density. However, the charge and discharge characteristics are lowered since resistance increases when Lithium (Li) ions are intercalated and deintercalated as the electrical conductivity of the $Li_4Ti_5O_{12}$ is low.

SUMMARY OF THE INVENTION

Therefore, the present invention has been made in view of the above problems, and it is an object of the present invention to provide a high capacity energy storage capacitor, which can improve charge and discharge characteristics by preventing increase of resistance when lithium (Li) ions are intercalated and deintercalated, by improving electrical conductivity by mixing and using an active material coated with nano-perforated graphene on the surface of a cathode or anode active material and nano-perforated graphene granular body.

Another object of the present invention is to provide a high capacity energy storage capacitor, which can implement high capacity by improving energy density by including LTO($Li_4Ti_5O_{12}$) in the cathode active material and including two or more of NMC($LiNiMnCoO_2$), LMO ($LiMn_2O_4$) and LCO($LiCoO_5$) in the anode active material.

To accomplish the above objects, according to one aspect of the present invention, there is provided a high capacity energy storage capacitor including: a cathode; and an anode arranged to face the cathode, wherein the cathode includes a current collector and a cathode material layer formed by applying a cathode material on one side or the other side of the current collector, and the anode includes a current collector an anode material layer formed by applying an anode material on one side or the other side of the current collector, wherein the cathode material is formed by mixing 70 to 99 wt % of nano-perforated graphene coating cathode active material and 1 to 30 wt % of nano-perforated graphene granular body, and the anode material is formed by mixing 70 to 95 wt % of nano-perforated graphene coating anode active material and 5 to 30 wt % of nano-perforated graphene granular body.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION

Figure 1:
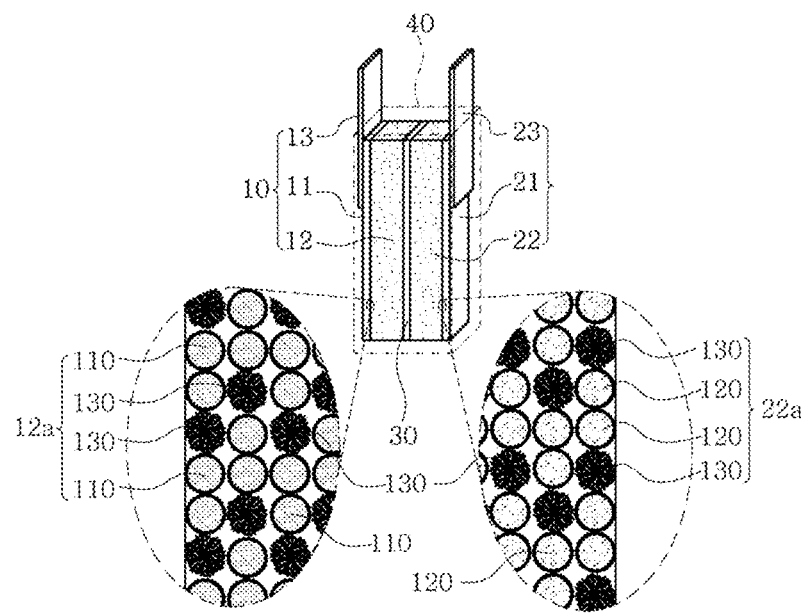
FIG. 1 is a cross-sectional view showing a high capacity energy storage capacitor of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereafter, an embodiment of a high capacity energy storage capacitor of the present invention will be described with reference to the accompanying drawings.

As shown in FIG. 1, a high capacity energy storage capacitor of the present invention includes a cathode 10, an anode 20, a separation film 30 and a case 40.

The cathode 10 is arranged to face the anode 20, and the anode 20 is arranged to face the cathode 10. The separation film 30 is arranged between the cathode 10 and the anode 20 to prevent physical contact between the cathode 10 and the anode 20, and the case 40 tightly seals the cathode 10, the anode 20 and the separation film 30 when the cathode 10, the anode 20 and the separation film 30 are inserted inside the case 40.

The configuration of the high capacity energy storage capacitor of the present invention is described below in further detail.

The cathode 10 includes a current collector 11, a cathode material layer 12 and a cathode external electrode 13 as shown in FIG. 1.

The current collector 11 generally supports the cathode 10, and the cathode material layer 12 is formed by applying a cathode material 12a on one side surface or the other side surface of the current collector 11. The cathode external electrode 13 is adhered to one side of the current collector 11 to be electrically connected to the current collector 11 while part of the cathode external electrode 13 is arranged to be protruded above the case 40 as shown in FIG. 1.

Figure 2:
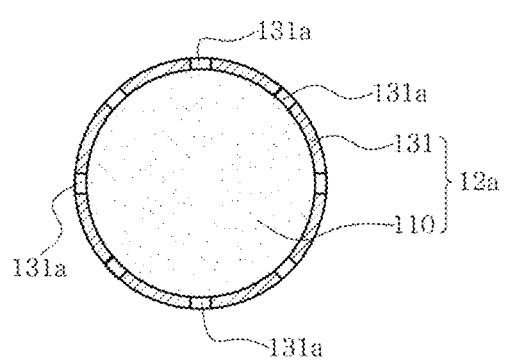
FIG. 2 is an exploded cross-sectional view showing the nano-perforated graphene coating cathode active material shown in FIG. 1.
Figure 4:
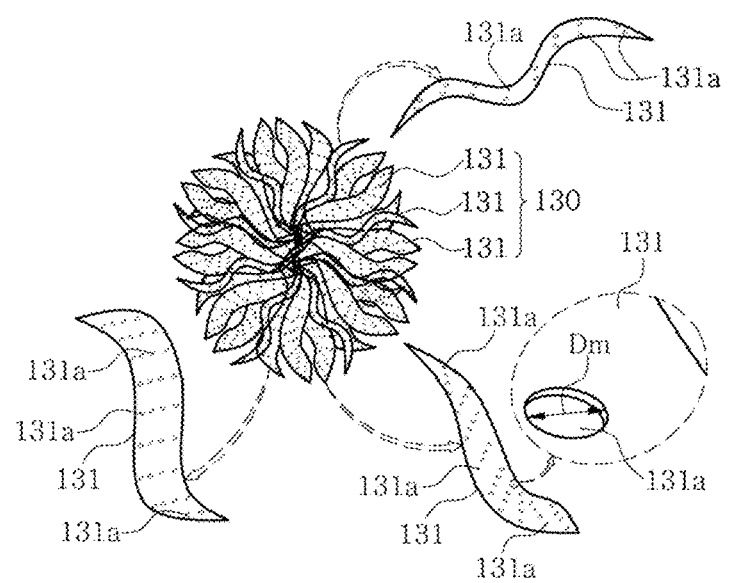
FIG. 4 is an exploded cross-sectional view showing the nano-perforated graphene granular body shown in FIG. 1.

The cathode material 12a is formed by mixing 70 to 99 wt % of nano-perforated graphene coating cathode active material 110 and 1 to 30 wt % of nano-perforated graphene granular body 130 as shown in FIGS. 1 and 2. That is, the nano-perforated graphene coating cathode active material 110 is formed by coating nano-perforated graphene 131 to wrap the surface of a cathode active material 111, and LTO ($Li_4Ti_5O_{12}$) is used as the cathode active material 111. For example, the nano-perforated graphene coating cathode active material 110 is formed to contain 0.5 to 5 wt % of nano-perforated graphene 131 and 95 to 99.5 wt % of cathode active material 111, and the cathode active material 111 is formed by wrapping the surface with the nano-perforated graphene 131 using powder morphology. Since the nano-perforated graphene coating cathode active material 110 is formed by wrapping the surface of the cathode active material 111 with the nano-perforated graphene 131 formed to arrange a plurality of holes 131a (shown in FIG. 4) like this, electrical conductivity of the cathode active material 111, i.e., LTO ($Li_4Ti_5O_{12}$), is improved.

Figure 3:
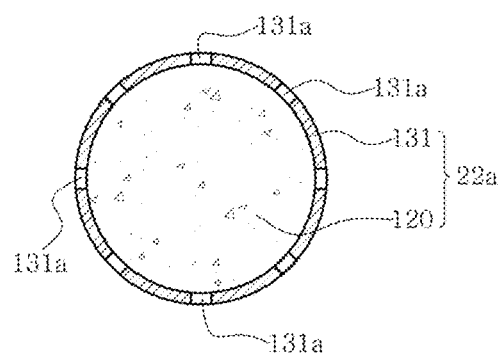
FIG. 3 is an exploded cross-sectional view showing the nano-perforated graphene coating anode active material shown in FIG. 1.

The anode 20 includes a current collector 21, an anode material layer 22 and an anode external electrode 23 as shown in FIGS. 1 and 3.

The current collector 21 generally supports the anode 20, and the anode material layer 22 is formed by applying an anode material 22a on one side surface or the other side surface of the current collector 21. The anode external electrode 23 is adhered to one side of the current collector 21 to be electrically connected to the current collector 21 while part of the anode external electrode 23 is arranged to be protruded above the case 40 as shown in FIG. 1.

The anode material 22a is formed by mixing 70 to 95 wt % of nano-perforated graphene coating anode active material 120 and 5 to 30 wt % of nano-perforated graphene granular body 130. The nano-perforated graphene coating anode active material 120 is formed by coating the nano-perforated graphene 131 to wrap the surface of an anode active material 121, and the anode active material 121 is manufactured using powder morphology. The nano-perforated graphene coating anode active material 120 is formed to contain 0.5 to 5 wt % of nano-perforated graphene 131 and 95 to 99.5 wt % of anode active material 121, and two or more of NMC($LiNiMnCoO_2$: lithium nickel manganese cobalt), LMO($LiMn_2O_4$: lithium manganese) and LCO($LiCoO_2$: lithium cobalt oxide) are mixed and used as the anode active material 121. Here, the $LiNiMnCoO_2$ uses any one of 1:1:1, 5:2:3, 6:2:2, 70:15:15 and 80:15:5 as a molar ratio of N(nickel):M(manganese):C(cobalt). Since the electrical characteristics of 1:1:1, 5:2:3, 6:2:2, 70:15:15 and 80:15:5, which are molar ratios of N(nickel):M(manganese):C(cobalt) of $LiNiMnCoO_2$, are publicized, detailed description thereof is omitted.

The nano-perforated graphene granular body 130 is contained in the cathode material 12a and the anode material 22a and is formed by manufacturing a plurality of nano-perforated graphenes 131 in a granular form using a spray dry method or a liquid phase method as shown in FIGS. 1 to 4. The plurality of nano-perforated graphenes 131 is formed by processing Reduced Graphene Oxide (RGO) using an alkaline solution to arrange a plurality of holes 131a on the RGO, and the average diameter of the plurality of holes 131a is 1 to 500 nm, and KOH is used as the alkaline solution. Since a publicized technique is applied as a method of manufacturing the RGO, detailed description thereof is omitted.

For the electrical test on the high capacity energy storage capacitor of the present invention like this, cathode materials 12a and anode materials 22a of various embodiments are prepared as shown in Table 1.

TABLE 1

|  | Anode material (wt %) | | | | Cathode material (wt %) | |
| --- | --- | --- | --- | --- | --- | --- |
|  | Material A | Material B | Material C | Material D | Material A | Material B |
| Embodiment 1 | 50 | 10 | 10 | 30 | 70 | 30 |
| Embodiment 2 | 60 | 30 | 5 | 5 | 80 | 20 |
| Embodiment 3 | 70 | 10 | 10 | 10 | 90 | 10 |
| Embodiment 4 | 60 | 30 | 5 | 5 | 99 | 1 |

As shown in Table 1, embodiments of the cathode materials 12a and the anode materials 22a are prepared as first to fourth embodiments.

First to fourth embodiments of the cathode material 12a are prepared using material A and material B. Material A of the cathode material 12a is the nano-perforated graphene coating cathode active material 110, which is formed by coating nano-perforated graphene 131 to wrap the surface of the cathode active material 111, and LTO ($Li_4Ti_5O_{12}$) is used as the cathode active material 111. The nano-perforated graphene granular body 130 is used as material B of the cathode material 12a.

First to fourth embodiments of the anode material 22a are prepared using material A, material B, material C and material D. The nano-perforated graphene coating anode active material 120 is used as material A, material B and material C of the anode material 22a, and the nano-perforated graphene coating anode active material 120 is formed by coating the nano-perforated graphene 131 to wrap the surface of the anode active material 121. Accordingly, material A of the anode material 22a uses NMC ($LiNiMnCoO_2$) as the anode active material 121, material B uses LMO ($LiMn_2O_4$) as the anode active material 121, and material C uses LCO ($LiCoO_2$) as the anode active material 121. That is, the nano-perforated graphene coating anode active material 120 is material A, material B and material C, and NMC ($LiNiMnCoO_2$) coated to wrap the nano-perforated graphene 131, LMO ($LiMn_2O_4$) coated to wrap the nano-perforated graphene 131, and LCO ($LiCoO_2$) coated to wrap the nano-perforated graphene 131 are respectively used as material A, material B and material C. The nano-perforated graphene granular body 130 is used as material D of the anode material 22a.

In the first embodiment, the cathode material 12a is prepared to contain 70 wt % of material A and 30 wt % of material B, and the anode material 22a is prepared to contain 70 wt % of nano-perforated graphene coating anode active material 120 and 30 wt % of material D. Here, the nano-perforated graphene coating anode active material 120 is prepared to contain 50 wt % of material A, 10 wt % of material B and 10 wt % of material C. In the second embodiment, the cathode material 12a is prepared to contain 80 wt % of material A and 20 wt % of material B, and the anode material 22a is prepared to contain 95 wt % of nano-perforated graphene coating anode active material 120 and 5 wt % of material D. Here, the nano-perforated graphene coating anode active material 120 is prepared to contain 60 wt % of material A, 30 wt % of material B and 5 wt % of material C. In the third embodiment, the cathode material 12a is prepared to contain 90 wt % of material A and 10 wt % of material B, and the anode material 22a is prepared to contain 90 wt % of nano-perforated graphene coating anode active material 120 and 10 wt % of material D. Here, the nano-perforated graphene coating anode active material 120 is prepared to contain 70 wt % of material A, 10 wt % of material B and 10 wt % of material C. In the fourth embodiment, the cathode material 12a is prepared to contain 99 wt % of material A and 1 wt % of material B, and the anode material 22a is prepared to contain 95 wt % of nano-perforated graphene coating anode active material 120 and 5 wt % of material D. Here, the nano-perforated graphene coating anode active material 120 is prepared to contain 60 wt % of material A, 30 wt % of material B and 5 wt % of material C.

In addition, in the first embodiment, the nano-perforated graphene coating cathode active material 110 of the cathode material 12a is formed to contain 5 wt % of nano-perforated graphene 131 and 95 wt % of cathode active material 111, and the nano-perforated graphene coating anode active material 120 of the anode material 22a is formed to contain 5 wt % of nano-perforated graphene 131 and 95 wt % of anode active material 121. In the second embodiment, the nano-perforated graphene coating cathode active material 110 of the cathode material 12a is formed to contain 0.5 wt % of nano-perforated graphene 131 and 99.5 wt % of cathode active material 111, and the nano-perforated graphene coating anode active material 120 of the anode material 22a is formed to contain 0.5 wt % of nano-perforated graphene 131 and 99.5 wt % of anode active material 121.

In the first to fourth embodiments prepared as shown in Table 1, the cathode material 12a and the anode material 22a are formed as slurry by mixing a conductive material, a binder and an organic solvent to be applied to the current collector 11 of the cathode 10 and the current collector 21 of the anode 20, and since a publicized technique is applied to the mixing ratio of the conductive material, the binder and the organic solvent, detailed description thereof is omitted. Here, one of Super-P, ketjen black and carbon black is used as the conductive material, one of polyvinylidene difluoride (PVDF), polytetrafluoroethylene (PTFE), styrene butadiene rubber (SBR) and carboxymethylcellulose (CMC) is used as the binder, and a publicized material for forming the cathode material 12a and the anode material 22a as slurry is used as the organic solvent. In the first to fourth embodiments of preparing slurry, the cathode material 12a and the anode material 22a are respectively pressed at a pressure of 50 to 200 kgf/cm2 to be applied to the current collector 11 of the cathode 10 and the current collector 21 of the anode 20, and the cathode 10 and the anode 20 are prepared by drying the cathode material 12a and the anode material 22a.

After both the cathode 10 and the anode 20 are manufactured, a high capacity energy storage capacitor of the present invention according to the first to fourth embodiments shown in Table 1 is manufactured by impregnating the cathode 10 and the anode 20 into a publicized electrolyte and interposing and arranging the separation film 30 inside the case 40 as shown in FIG. 1, and an electrical test has been conducted. The result of the electrical test conducted on the high capacity energy storage capacitor of the present invention according to the first to fourth embodiments is shown in Table 2 and FIGS. 5 and 6.

TABLE 2

|  | Cell voltage (V) | Energy density (Wh/L) | DC-ESR(mΩ) |
| --- | --- | --- | --- |
| Embodiment 1 | 2.7 | 50 | 15.2 |
| Embodiment 2 | 2.7 | 48 | 16.3 |
| Embodiment 3 | 2.7 | 55 | 16.7 |
| Embodiment 4 | 2.7 | 52 | 18.0 |

As shown in Table 2, in the first to fourth embodiments, the cell voltage is 2.7V, and the energy density is measured as 50 Wh/L, 48 Wh/L, 55 Wh/L and 52 Wh/L in order. The DC (direct current)-ESR (equivalent series resistance) characteristic of the first to fourth embodiments is measured as 15.2 mΩ, 16.3 mΩ, 16.7 mΩ and 18.0 mΩ in order. Contrarily, as a result of the measurement conducted after manufacturing the cathode material 12a and the anode material 22a using active carbon, i.e., manufacturing a conventional electric double layer capacitor, it is measured that the cell voltage is 2.7V, the energy density is 6 Wh/L, and the DC-ESR characteristic is 13 mΩ. That is, as shown in Table 2, it is measured in the first to fourth embodiments that the energy density and the DC-ESR characteristic are improved compared with the conventional electric double layer capacitor, in which the cathode material 12a and the anode material 22a are manufactured using active carbon. Here, since the cell voltage, the energy density and the DC-ESR characteristic are measured using publicized test equipment (not shown), description on the test equipment is omitted. The energy density is measured on the basis of 1C discharge condition, and the 1C discharge condition represents a discharge condition of C-rate=1, which means that the discharge current is equal to the rated capacity of a cell.

That is, in the high capacity energy storage capacitor of the present invention, the cathode material 12 includes $Li_4Ti_5O_{12}$ coated by the nano-perforated graphene 131 to wrap the surface and the nano-perforated graphene granular body 130, and the anode material 22a includes two or more of NMC($LiNiMnCoO_2$), LMO($LiMn_2O_4$) and LCO($LiCoO_2$) coated to wrap the surface of the nano-perforated graphene 131 and the nano-perforated graphene granular body 130, and thus electrical conductivity is improved. Therefore, the charge and discharge characteristics can be improved by preventing increase of resistance, i.e., improving the DC-ESR characteristic, when Lithium (Li) ions are intercalated and deintercalated. That is, the high capacity energy storage capacitor of the present invention may maintain linearity of charge and discharge proportional to each other by improving the DC-ESR characteristic and implement high capacity by improving energy density.

Figure 5:
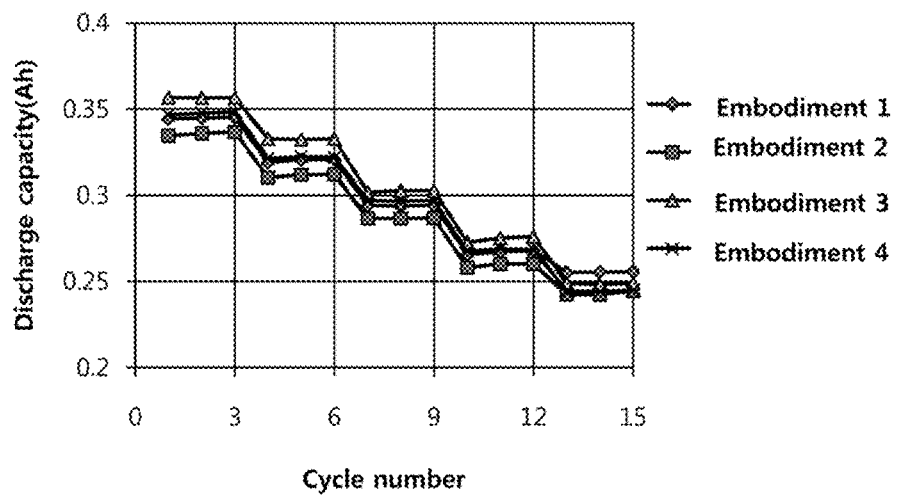
FIG. 5 is a graph showing a result of testing the discharge characteristic of the high capacity energy storage capacitor of the present invention shown in FIG. 1.
Figure 6:
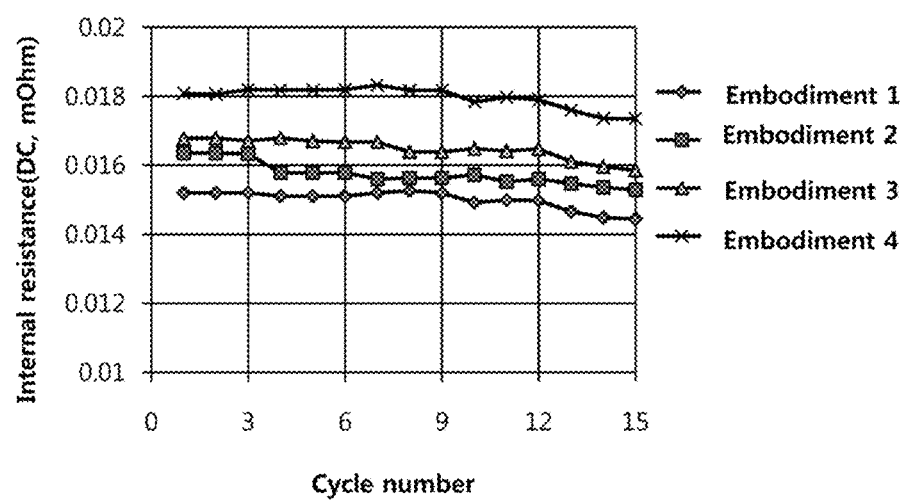
FIG. 6 is a graph showing a result of measuring inner resistance of the high capacity energy storage capacitor of the present invention shown in FIG. 1.

A result of measuring discharge capacity and internal resistance conducted in the first to fourth embodiments as shown in Table 1 is shown in FIGS. 5 and 6. FIG. 5 shows a result of measuring the discharge capacity in the first to fourth embodiments, and although it is measured that the discharge capacity is highest at 1 C to 20 C in the third embodiment and lowest in the second embodiment, the discharge capacity is generally improved in the first to fourth embodiments. FIG. 6 shows a result of measuring the internal resistance in the first to fourth embodiments, and although it is measured that the internal resistance is lowest at 1 C to 20 C in the first embodiment and highest at 1 C to 20 C in the fourth embodiment, the internal resistance is generally improved in the first to fourth embodiments. If the amount of the nano-perforated graphene 131 or the nano-perforated graphene granular body 130 mixed in the cathode material 12a and the anode material 22a increases like this, the discharge capacity or the internal resistance is improved, and linear discharge and charge can be implemented.

The high capacity energy storage capacitor of the present invention can be applied to the industrial field of manufacturing super capacitors.

The high capacity energy storage capacitor of the present invention is advantageous in that charge and discharge characteristics can improved by preventing increase of resistance when lithium (Li) ions are intercalated and deintercalated, by improving electrical conductivity by mixing and using an active material coated with nano-perforated graphene on the surface of a cathode or anode active material and nano-perforated graphene granular body, and high capacity can implemented by improving energy density by including LTO($Li_4Ti_5O_{12}$) in the cathode active material and including two or more of NMC($LiNiMnCoO_2$), LMO ($LiMn_2O_4$) and LCO($LiCoO_5$) in the anode active material.

What is claimed is:

1. A high capacity energy storage capacitor comprising:
    a cathode; and
    an anode arranged to face the cathode,
    wherein the cathode includes a current collector and a cathode material layer formed by applying a cathode material on one side or the other side of the current collector, and the anode includes a current collector an anode material layer formed by applying an anode material on one side or the other side of the current collector, and
    wherein the cathode material is formed by mixing 70 to 99 wt % of nano-perforated graphene coating cathode active material and 1 to 30 wt % of nano-perforated graphene granular body, and the anode material is formed by mixing 70 to 95 wt % of nano-perforated graphene coating anode active material and 5 to 30 wt % of nano-perforated graphene granular body.

2. The capacitor according to claim 1, wherein the nano-perforated graphene coating cathode active material is formed by coating nano-perforated graphene to wrap a surface of a cathode active material, and LTO ($Li_4Ti_5O_{12}$) is used as the cathode active material.

3. The capacitor according to claim 1, wherein the nano-perforated graphene coating cathode active material is formed to contain 0.5 to 5 wt % of nano-perforated graphene and 95 to 99.5 wt % of cathode active material, and LTO ($Li_4Ti_5O_{12}$) is used as the cathode active material.

4. The capacitor according to claim 1, wherein the nano-perforated graphene coating anode active material is formed by coating nano-perforated graphene to wrap a surface of an anode active material, and the anode active material is a mixture of at least two selected from the group consisting of NMC ($LiNiMnCoO_2$: Lithium Nickel Manganese Cobalt), LMO ($LiMn_2O_4$: Lithium Manganese) and LCO ($LiCoO_2$: Lithium Cobalt Oxide).

5. The capacitor according to claim 1, wherein the nano-perforated graphene coating anode active material is formed to contain 0.5 to 5 wt % of nano-perforated graphene and 95 to 99.5 wt % of anode active material, and the anode active material is a mixture of at least two selected from the group consisting of NMC ($LiNiMnCoO_2$: Lithium Nickel Manganese Cobalt), LMO ($LiMn_2O_4$: Lithium Manganese) and LCO ($LiCoO_2$: Lithium Cobalt Oxide).

6. The capacitor according to claim 4, wherein a molar ratio of N(nickel):M(manganese):C(cobalt) of the $LiNiMnCoO_2$ is any one of 1:1:1, 5:2:3, 6:2:2, 70:15:15 and 80:15:5.

7. The capacitor according to claim 1, wherein the nano-perforated graphene granular body is formed by manufacturing a plurality of nano-perforated graphenes in a granular form using a spray dry method or a liquid phase method.

8. The capacitor according to claim 7, wherein the plurality of nano-perforated graphenes is formed by processing Reduced Graphene Oxide (RGO) using an alkaline solution to arrange a plurality of holes on the RGO, and an average diameter of the plurality of holes is 1 to 500 nm, and KOH is used as the alkaline solution.

* * * * *